Nov. 18, 1924.

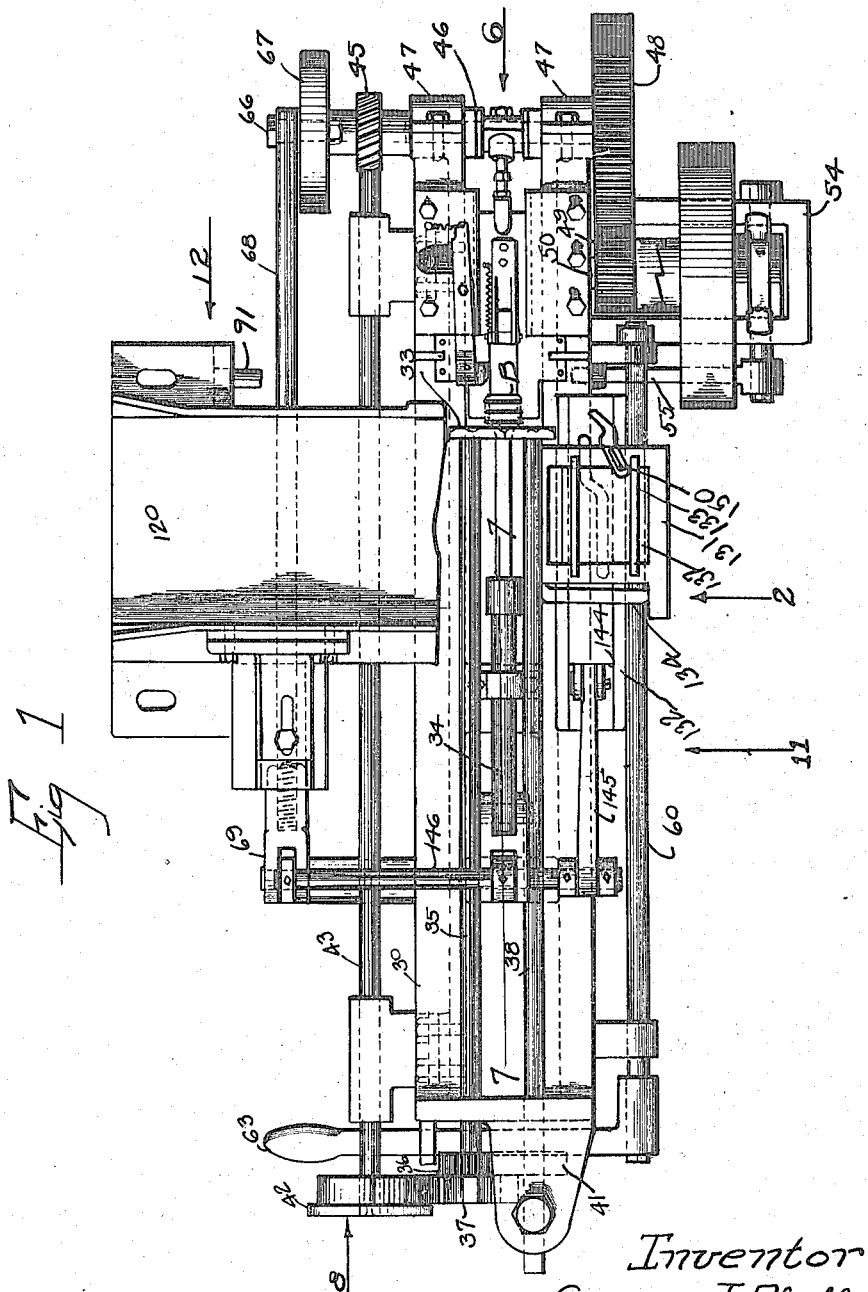

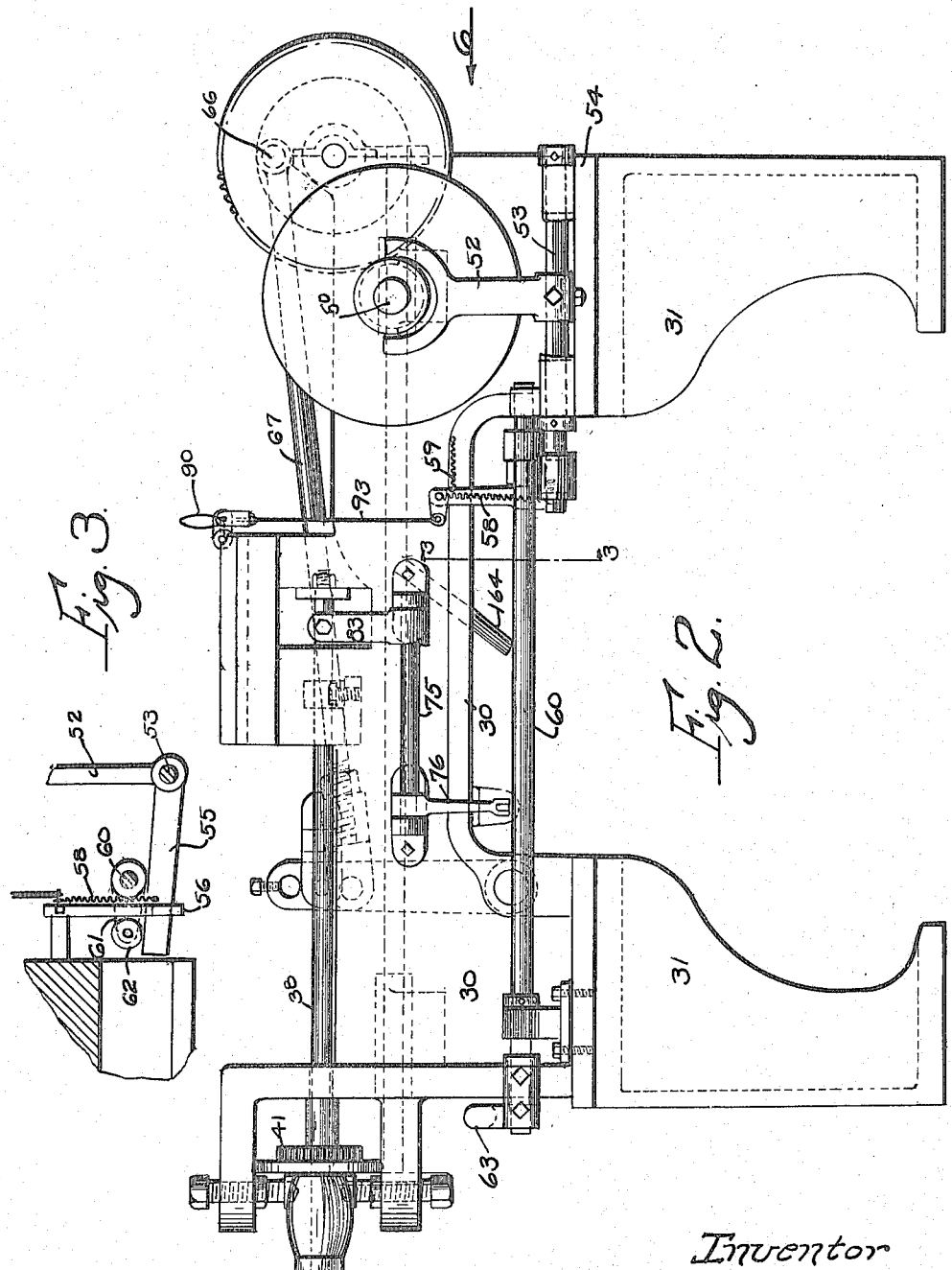

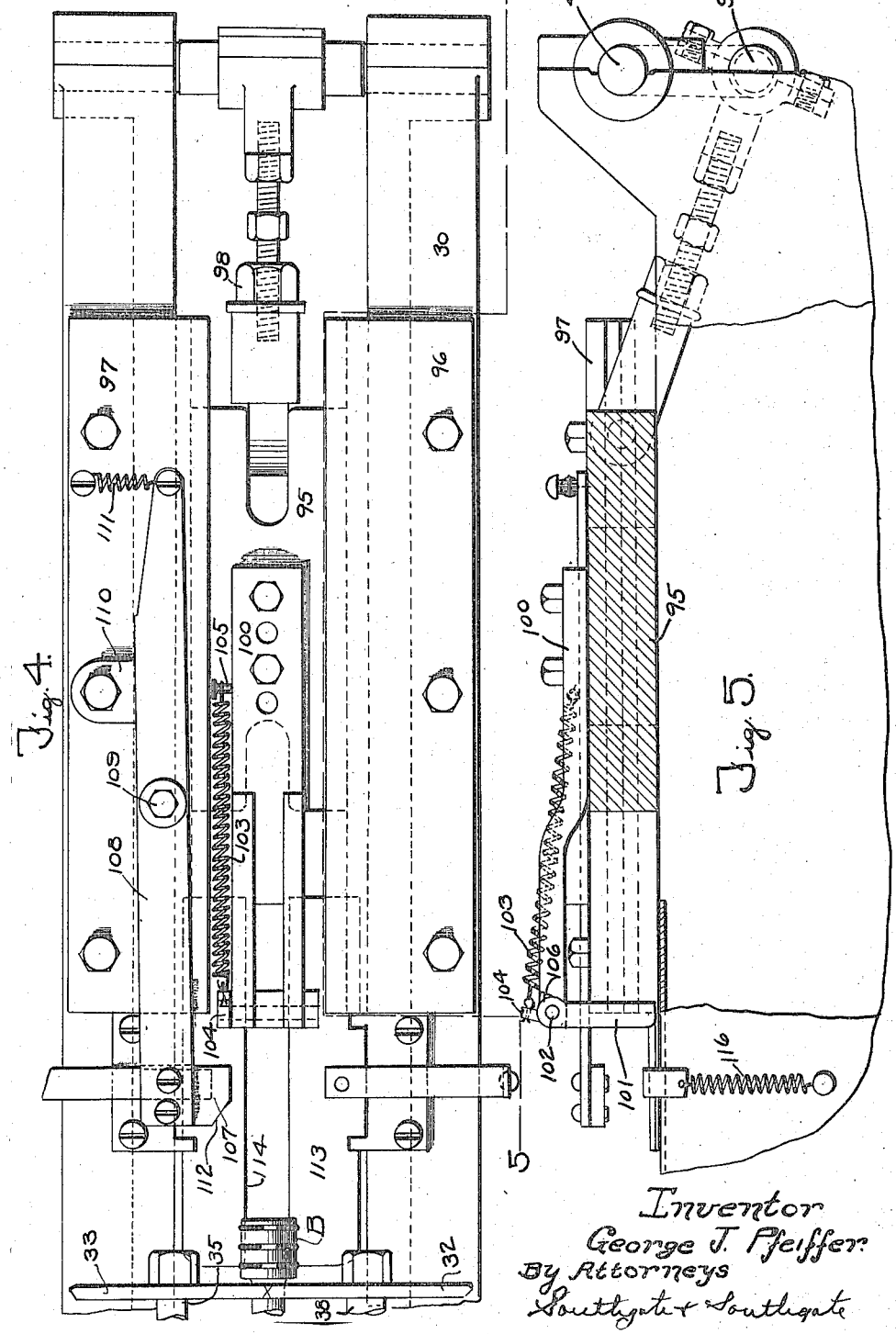

G. J. PFEIFFER 1,515,880

BOBBIN STRIPPER

Filed Feb. 14, 1922   9 Sheets-Sheet 4

Inventor
George J Pfeiffer
By Attorneys
Southgate & Southgate

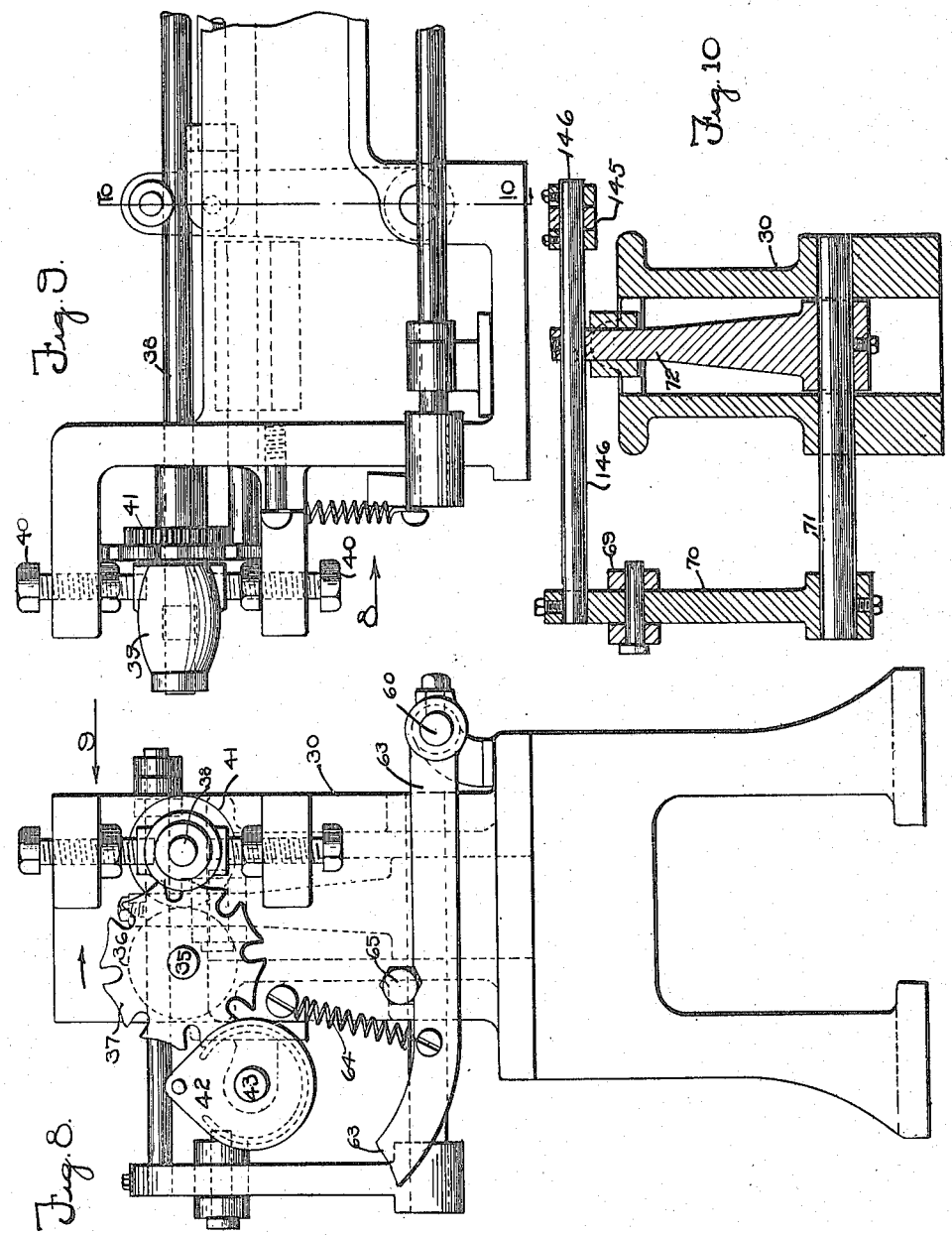

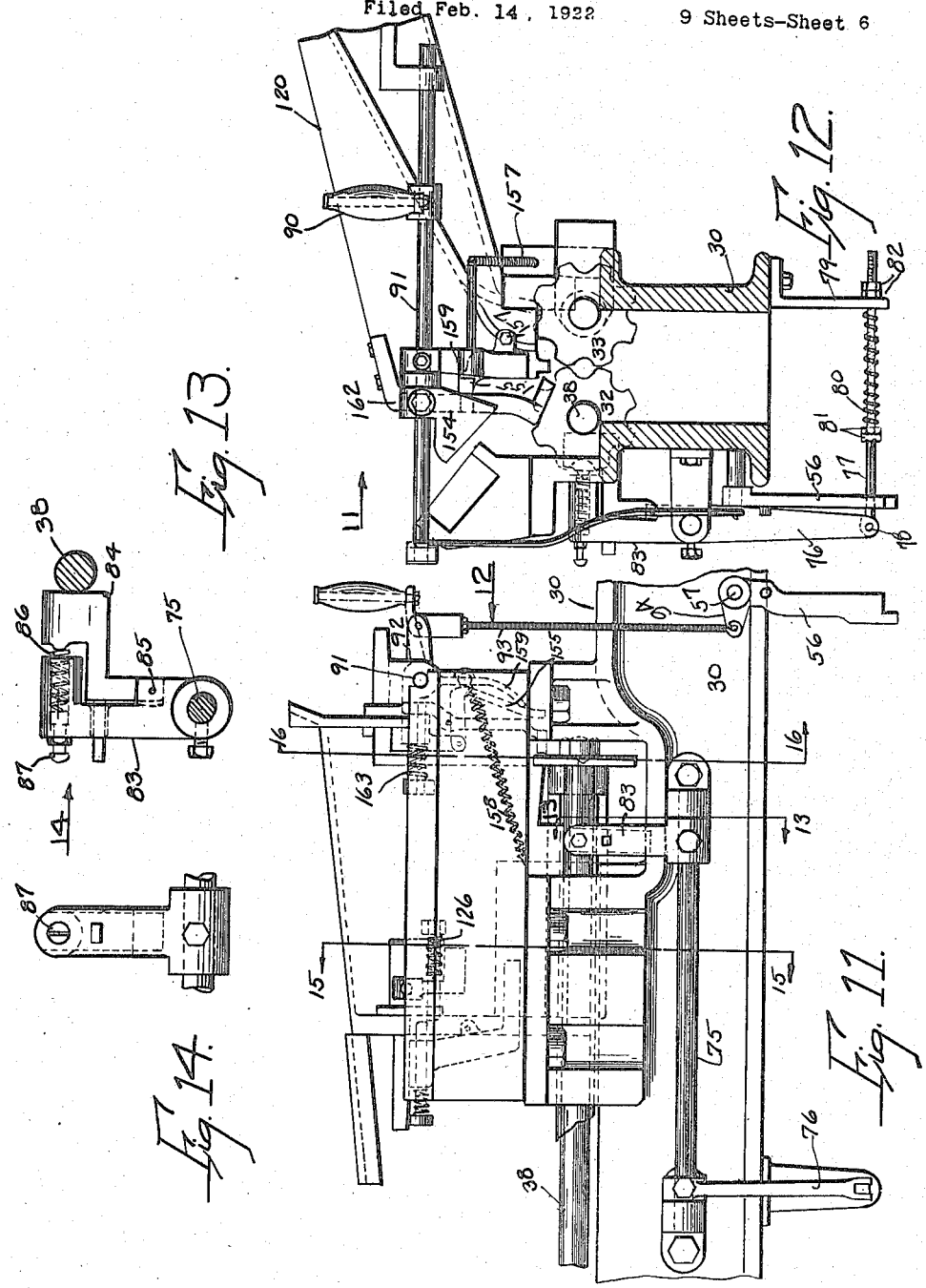

Nov. 18, 1924.  1,515,880
G. J. PFEIFFER
BOBBIN STRIPPER
Filed Feb. 14, 1922   9 Sheets-Sheet 7
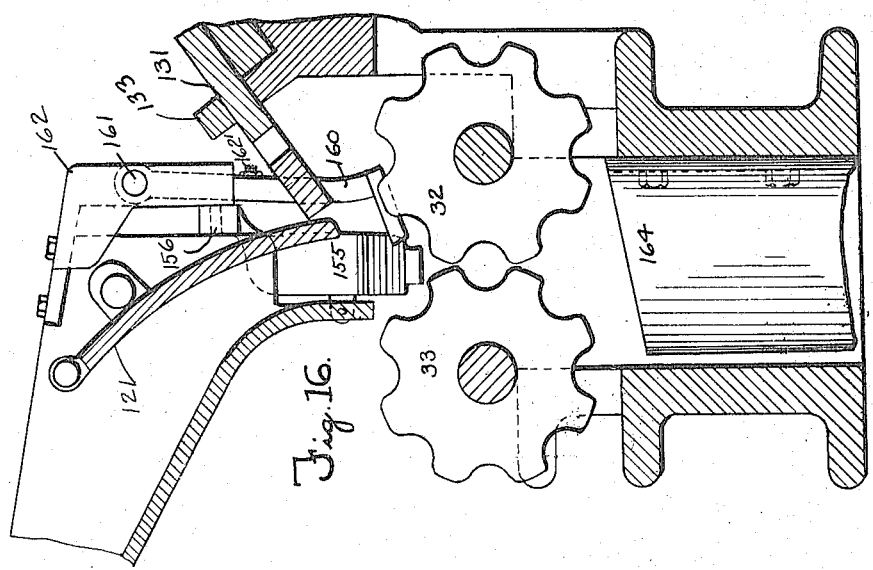
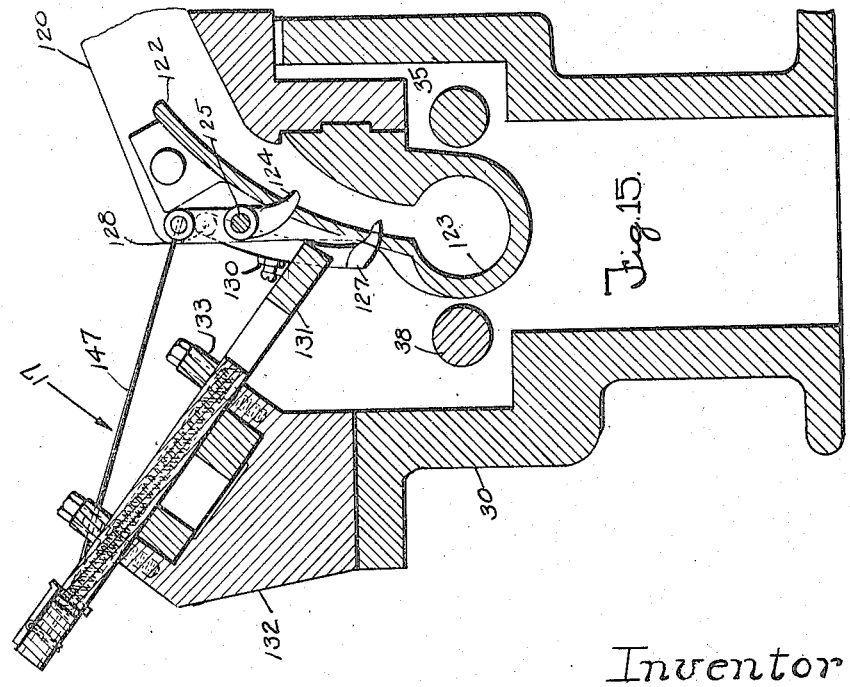
Inventor
George J. Pfeiffer,
By Attorneys
Southgate & Southgate

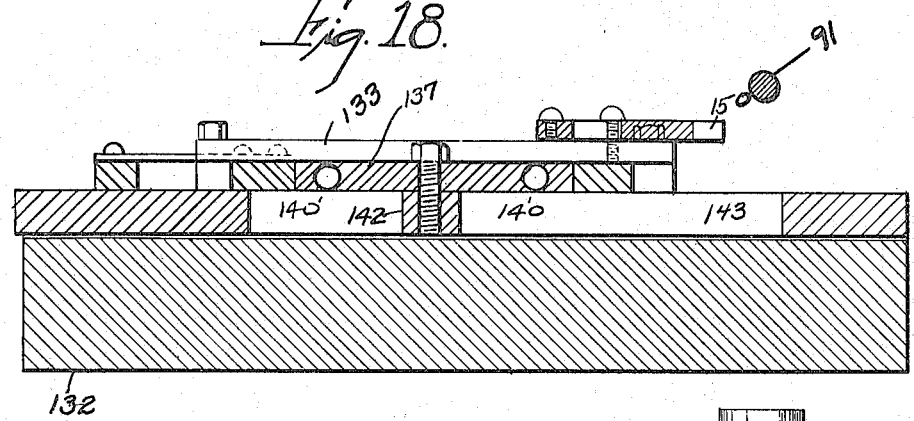
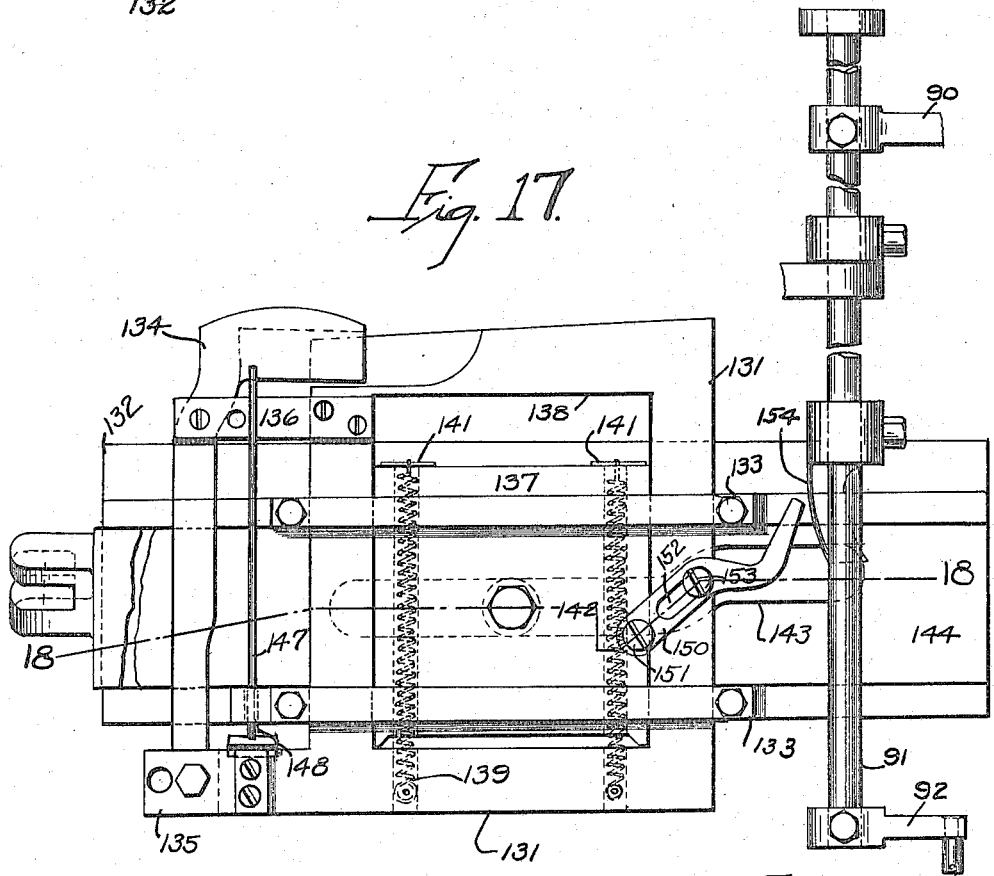

Nov. 18, 1924.  1,515,880
G. J. PFEIFFER
BOBBIN STRIPPER
Filed Feb. 14, 1922  9 Sheets-Sheet 9
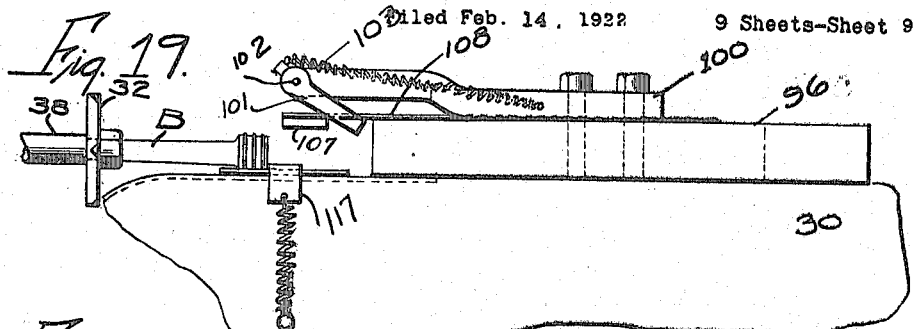
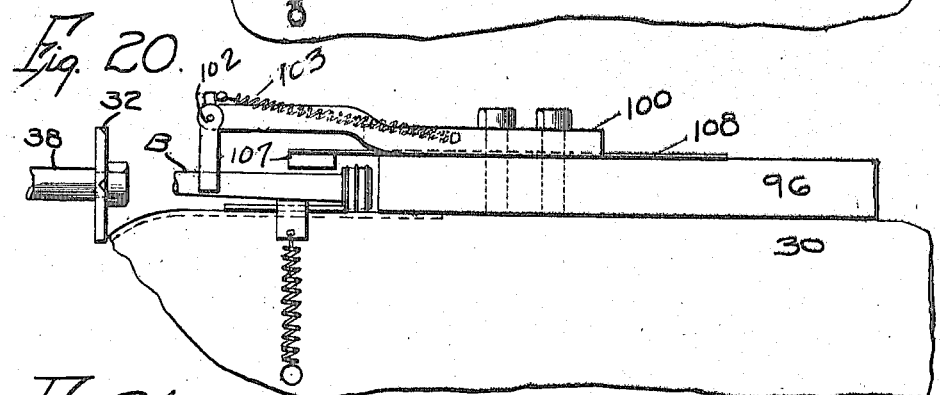
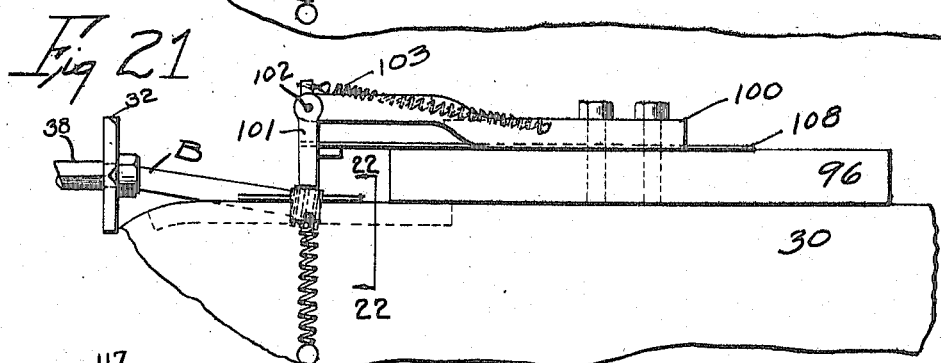
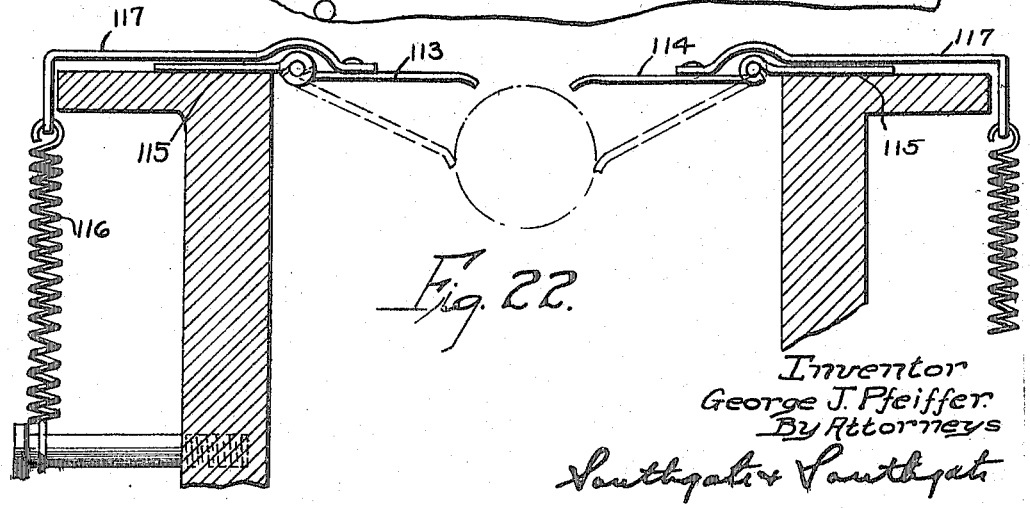
Inventor
George J. Pfeiffer
By Attorneys
Southgate & Southgate Patented Nov. 18, 1924.

1,515,880

UNITED STATES PATENT OFFICE.

GEORGE J. PFEIFFER, OF PROVIDENCE, RHODE ISLAND, ASSIGNOR TO CROMPTON & KNOWLES LOOM WORKS, OF WORCESTER, MASSACHUSETTS, A CORPORATION OF MASSACHUSETTS.

BOBBIN STRIPPER.

Application filed February 14, 1922. Serial No. 536,536.

*To all whom it may concern:*

Be it known that I, GEORGE J. PFEIFFER, a citizen of the United States, residing at Providence, in the county of Providence and State of Rhode Island, have invented a new and useful Bobbin Stripper, of which the following is a specification.

This invention relates to a machine for removing waste yarn from loom bobbins or other weft carriers. Certain types of automatic looms now in common use are designed to eject a substantially exhausted bobbin or weft carrier with a small amount of yarn still remaining on the bobbin, thus avoiding mispicks and other defects in the cloth. Where such looms are in use, large quantities of bobbins quickly accumulate, each having a small amount of yarn remaining on the butt of the bobbin, which yarn must be removed before the bobbin can be again used.

It is the general object of my invention to provide an improved machine for removing or stripping this waste yarn from the ejected bobbins. A more specific object of my invention is to provide a bobbin stripper in which the bobbin is moved by two successive actuating devices, the first of which pushes the bobbin partially through the stripping jaws and the second of which completes the stripping operation.

Further features of my invention relate to means for automatically stopping the machine whenever it is clogged by a misplaced bobbin; to an improved bobbin feeding device associated therewith; to the provision of graduated spring pressure upon the stripping jaws; and to improved driving mechanism and connections through which the machine is actuated.

My invention further relates to arrangements and combination of parts which will be hereinafter described and more particularly pointed out in the appended claims.

A preferred form of my invention is shown in the drawings in which

Fig. 1 is a plan view of my improved bobbin stripper;

Fig. 2 is a rear elevation thereof;

Fig. 3 is a detail sectional elevation taken along the line 3—3 in Fig. 2;

Fig. 4 is a plan view of the bobbin pulling mechanism;

Fig. 5 is a side elevation of the parts shown in Fig. 4; partly in section and taken along the line 5—5 in Fig. 4;

Fig. 8 is a left hand end elevation;

Fig. 9 is a partial rear elevation, looking in the direction of the arrow 9 in Fig. 8;

Fig. 10 is a transverse sectional elevation of certain parts taken along the line 10—10 in Fig. 9;

Fig. 11 is an enlarged rear elevation of the hopper and certain associated parts;

Fig. 12 is a sectional end elevation, showing the parts found in Fig. 11;

Fig. 13 is a detail sectional elevation, taken along the line 13—13 in Fig. 11;

Fig. 14 is a rear view of the parts shown in Fig. 13;

Figure 6:
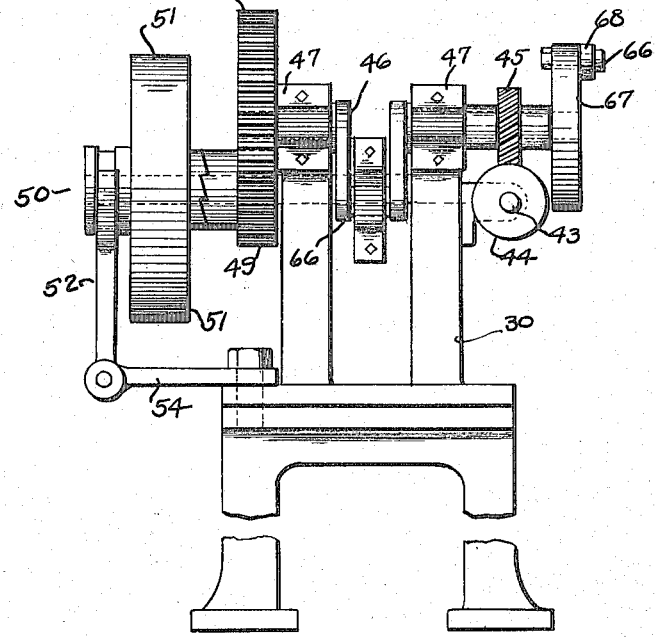
Fig. 6 is a right hand elevation of the machine, as viewed in Fig. 1.

Figs. 15 and 16 are transverse sectional elevations taken along the lines 15—15 and 16—16 in Fig. 11 but looking in opposite directions;

Fig. 17 is substantially a plan view of parts of the bobbin feeding and stop motion mechanism, looking in the direction of the arrow 17 in Fig. 15;

Fig. 18 is a longitudinal sectional view taken along the line 18—18 in Fig. 17;

Figs. 19, 20 and 21 are detail rear elevations, illustrating the operation of the bobbin pulling mechanism; and Fig. 22 is an enlarged detail sectional view taken along the line 22—22 in Fig. 21.

Referring to the drawings, I have shown my improved bobbin stripper assembled upon a frame 30 (Fig. 2) which may be provided with supporting legs 31.

Figure 7:
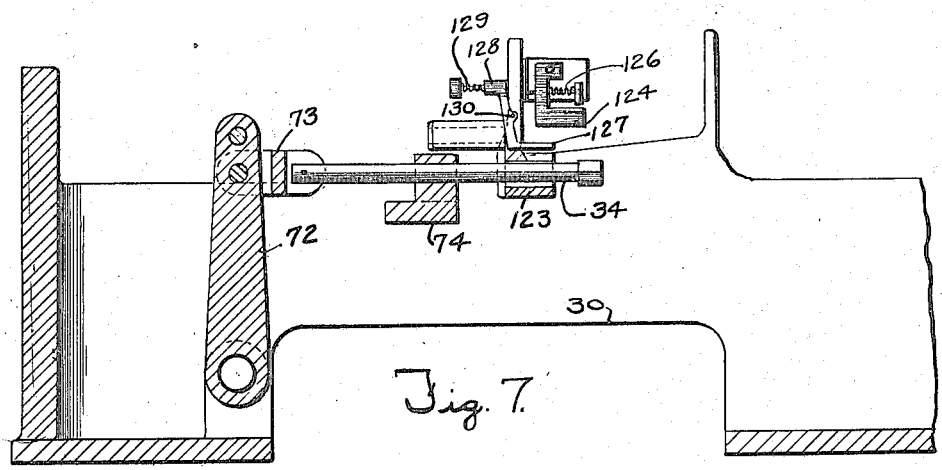
Fig. 7 is a longitudinal sectional elevation of certain parts, taken along the line 7—7 in Fig. 1.

During the first part of the stripping operation, the bobbins B are held between rotary stripping plates 32 and 33 (Fig. 16) and are partially ejected axially from between these plates by a plunger 34 (Figs. 1 and 7).

The stripping plates 32 and 33 are notched as shown in Figs. 12 and 16 and are similar both in appearance and function to the stripping plates shown in the prior patent to Ryon, No. 1,136,051 issued April 21, 1915.

The plate 33 is mounted on a shaft 35

(Fig. 1) rotatable in fixed bearings on the frame 30 and having a spur gear 36 and a dwell gear or star wheel 37 (Fig. 8) secured to its outer end. The stripping plate 32 is mounted on a similar shaft 38, the outer end of which is supported in a swivel bearing 39 (Fig. 9) which permits the shaft 38 to swing horizontally about the bearing pivots 40, so that the plate 32 may approach or recede from the plate 33.

A gear 41 on the shaft 38 meshes with the gear 36 on the shaft 35 and is of equal size. A single tooth locking pinion 42 is mounted on a shaft 43 supported in bearings on the frame 30 (Fig. 1) and extending to the opposite or right hand end of the machine where it is connected by spiral gears 44 (Fig. 6) and 45 (Fig. 1) to a crank shaft 46 rotatable in bearings 47 on the end of the frame 30.

The shaft 46 is connected by a gear 48 and pinion 49 to a shaft 50 on which a drive pulley 51 (Fig. 6) is loosely mounted. The pinion 49 and pulley 51 are provided with co-operating clutch teeth and the pulley is axially movable to engage or disengage these teeth by means of a yoke lever 52 mounted on a cross shaft 53 (Fig. 2) supported in a bearing frame 54 (Fig. 1) bolted to the frame 30.

An arm 55 (Fig. 3) on the shaft 53 extends beneath the frame 30 in position for engagement by a latch 56 (Fig. 11) pivoted at 57 on the frame 30. A spring 58 (Figs. 2 and 3) yieldingly moves the arm 55 upward and tends to disengage the driving pulley 51 from the pinion 49. A second spring 59 yieldingly moves the latch 56 to engage the arm 55 when said arm 55 is depressed. A shipper rod 60 extends lengthwise of the machine, as shown in Fig. 2, and is provided at its right hand end with an arm 61 (Fig. 3) and a roll 62 positioned to engage the arm 55 on the cross shaft 53. At its left hand end the shipper rod 60 is provided with a handle 63 (Figs. 1 and 8) extending across the end of the machine and held yieldingly in raised position by a spring 64 (Fig. 8) which causes the handle to engage a bolt 65 in the end of the frame 30 which acts as a stop for the handle.

To start the machine, it is merely necessary to depress the handle 63, swinging downward the arm 55 until engaged by the latch 56 which holds the parts in driving position.

The crank shaft 46 is provided with a crank pin 66 (Fig. 1) on a disc 67. One end of a connecting rod 68 is pivoted on the pin 66 and the opposite end is connected by an adjustable head 69 to an arm 70 (Fig. 10) fixed to a cross shaft 71 supported in bearings in the frame 30. A second arm 72 is secured to the cross shaft between its bearings and is connected by a link 73 (Fig. 7) to the head of the bobbin engaging plunger 34 which is slidable in a fixed bearing 74 in the frame 30.

Yielding lateral tension is applied to the movable shaft 38 and stripper plate 32 by devices best shown in Figs. 11 to 14. These devices comprise a rod 75 pivoted in bearings on the frame 30 and having an arm 76 extending downward therefrom. A rod 77 is connected at 78 to the arm 76 and its opposite end is loosely slidable in a bracket 79 secured to the under side of the frame 30.

A heavy coil spring 80 surrounds the rod 77 and the tension thereof may be adjusted by lock nuts 81. A second pair of lock nuts 82 may be adjusted to limit outward movement of the rod 77 under the action of the spring 80.

A second arm 83 (Fig. 13) is fixed to the rod 75 and extends upward adjacent the shaft 38. A contact plate 84 is pivoted at 85 on the arm 83 and is pressed yieldingly against the shaft 38 by a coil spring 86 seated in a recess in the upper end of the arm 83 and provided with a screw 87 for adjusting the tension thereof.

As the stripper plate 32 is pushed away from the plate 33 by the entrance of a bobbin to be stripped, the shaft 38 at first yields easily against the light tension of the spring 86. When the plates 32 and 33 have been separated sufficiently to admit the butt of the bobbin between them, the contact plate 84 positively engages the arm 83 and further separation of the stripper plates may be obtained only by compressing the heavy spring 80. The plates 32 and 33 are thus held firmly in stripping relation and yield from this position only when it is necessary to prevent breakage.

In addition to the stripper handle 63, I have provided another handle 90 (Figs. 11 and 12) by which the machine may be stopped. This handle is secured to a cross shaft 91 mounted in fixed bearings above the frame 30 and having an arm 92 connected by a link 93 with a short arm 94 forming a part of the latch 56. By moving the handle 90, the latch may be withdrawn and the clutch released. This handle is only useful for stopping the machine and does not take the place of the stripper handle 63 in starting the same.

The plunger 34 engages the tip of a bobbin held between the stripping jaws 32 and 33 and forces it outward or to the right in Fig. 1 until it reaches the position indicated in Figs. 19 and 20. The bobbin is then engaged by a bobbin pulling device to be described, which completes the movement of the bobbin from between the stripping jaws.

Referring to Figs. 4 and 5, this pulling device comprises a sliding block 95 mounted in guide-ways 96 and 97 on the frame 30 and connected by an adjustable link 98 to a crank 99 on the crank shaft 46. A plate 100 is bolted to the top of the block 95 and projects a considerable distance beyond the end of the block as shown in Fig. 5.

A forked member 101 is pivoted at 102 to the end of the plate 100 and is held in the position shown in Fig. 5 by a tension spring 103 which connects an ear 104 on the member 101 to a pin 105 in the plate 100. A stop 106 limits the movement of the member 101 by the spring 103.

A block 107 is mounted on a lever 108 (Fig. 4) pivoted at 109 on the guide-way 97 and normally held against the stop plate 110 by a spring 111. The block 107 has a cam face 112 for a purpose to be described.

As the bobbin is partially ejected from between the stripper plates 32 and 33, the head of the bobbin rests upon plates 113 and 114 (Figs. 4 and 22) pivotally supported on hinge plates 115 and yieldingly held in the position shown in full lines in Fig. 22 by springs 116 connected to arms 117 projecting outwardly from the plates 113 and 114 and acting also as stops to determine the normal position of the plates.

As the bobbin pulling device is moved to the left from the position shown in Fig. 4 to that shown in Fig. 20, the forked member 101 engages the block 107 and is swung upward as indicated in Fig. 19 to pass over the head of the bobbin B to be engaged. After the member 101 passes beyond the block 107, it snaps downward into the position shown in Fig. 20. As it thereafter returns to the position shown in Fig. 4, it engages the head or butt of the partially stripped bobbin and pulls it from between the stripping plates 32 and 33. On this return movement, it engages the cam surface 112 of the block 107 and pushes the block easily out of its path.

As this return movement of the block 95 and the bobbin engaging member 101 is positive, I have provided the spring plates 113 and 114 so that a misplaced bobbin, if engaged by the member 101, may be forced downward between the spring plate as indicated in Fig. 22, without injury to the apparatus.

The hopper and feeding mechanism of the machine will now be described. An inclined table or hopper 120 (Figs. 1 and 12) is mounted above the stripping mechanism and is so arranged that the bobbins will move by gravity toward the rear or delivery end of the hopper, the butts of the bobbins being disposed at the right of the hopper as viewed in Figs. 1 and 11. A guide plate 121 (Fig. 16) is secured to the right hand end wall of the hopper to direct the butts of the bobbins as they approach the stripping plates 32 and 33. A similar guide 122 (Fig. 15) on the left hand end wall of the hopper directs the tips of the bobbins into a recessed member 123 which lies in the path of the plunger 34 (Fig. 7).

A finger 124 (Fig. 15) is pivoted at 125 on the end of the hopper and extends into the guide-way or passage through which the bobbins tips enter the recessed member 123. A spring 126 (Figs. 7 and 11) normally holds the finger 124 in the position shown in Fig. 15. Mechanism to be described is provided for periodically withdrawing the finger 124 to permit the passage of a bobbin tip.

A second holding arm 127 (Fig. 15) is pivoted at 128 on the end of the hopper and is yieldingly held in the path of the plunger by a coil spring 129 (Fig. 7). The position of the holding arm 127 may be adjusted by means of a screw 130 (Fig. 7) engaging the fixed wall of the hopper.

A feed plate 131 (Figs. 15 and 17) is mounted to slide on a bracket or casting 132 supported by the frame 30. The plate 131 is formed substantially in the shape of a hollow rectangle and is guided for movement transversely of the bracket 132 by bars 133 overlying the plate and bolted to the bracket.

An auxiliary arm 134 is provided for engaging the tips of the bobbins, this member being adjustably secured to extensions 135 and 136 (Fig. 17) of the plate 131. The position of the member 134 may be varied to correspond to the length of the bobbins which are being handled.

A rectangular block 137 is mounted to slide in the opening 138 of the plate 131 and is yieldingly held in the position shown in Fig. 17 by two springs 139 extending through openings 140 (Fig. 18) in the block 137 and secured to the block at its opposite face in any convenient manner as by cross pins 141.

A cam roll 142 (Fig. 18) is pivotally mounted beneath the block 137 and extends into a cam slot 143 in a slide 144 mounted in guide ways in the bracket 132 (Fig. 15). The slide 144 is connected by a link 145 (Fig. 1) to a cross rod 146 (Fig. 10) secured in the upper ends of the swinging arms 70 and 72. The cam slot 143 is so disposed that movement of the slide to the left, as the plunger 34 is withdrawn, will advance the block 137 and plate 131 to engage the lowermost bobbin in the hopper and force it past the yielding arm 127 into the recessed member 123.

A rod 147 (Fig. 17) is loosely connected at 148 to the extension 135 of the plate 131. The other end of the rod 147 (Fig. 15) is connected to the upper end of the finger 124 in such a way that the downward feeding movement of the plate 131 also withdraws the finger 124 to permit advance movement of the next bobbin.

A lever 150 (Fig. 17) is pivoted at 151 to the block 137 and has a slot 152 through which extends a screw 153 fixed in the plate 131. The end of the lever 150 is positioned adjacent a cam plate 154 (Figs. 12 and 17) of substantially triangular outline and mounted on the cross shaft 91 previously described.

If feeding movement of the plate 131 is prevented by a misplaced bobbin, the block 137 will slide in the opening 138 of the plate, thus swinging the lever 150 about the screw 153 and causing it to engage the plate 154 and turn the shaft 91 to release the latch 56 and stop the machine, as previously described.

A plate 155 (Figs. 11 and 16) is pivoted to the hopper at 156 and extends downward and inward to form a yielding wall portion adjacent the point where the bobbins are delivered to the stripping plates 32 and 33. A stop screw 157 determines the position of the plate 155 and a relatively strong spring 158 yieldingly maintains the plate in operative position. An arm 159 (Figs. 11 and 12) on the shaft 91 is engaged by the plate 155 whenever it is moved from operative position and thereby stops the machine. A latch 160 (Fig. 16) is pivoted on 161 on a plate 162 on the hopper and corresponds in function to the arm 127 previously described. The normal position of the latch is determined by an adjusting screw 162' engaging the end wall of the hopper and a spring 163 (Fig. 11) permits yielding movement of the latch as the bobbins are forced downward by the plate 131.

The method of operation of my improved machine has been pointed out in connection with the description of the detailed parts and an extended explanation of the operation is considered unnecessary. The bobbins are placed in the hopper 120 and the parts are so timed that the plate 131 pushes a bobbin downward at the same time that the one-toothed pinion 42 advances the star wheel 37 and turns the stripping discs 32 and 33 from one operative position to the next. The plunger 34 then advances, pushing the bobbin axially between the stripping plates to the position indicated in Fig. 20. The pulling device 101 is then advanced to engage the butt of the bobbin and completely withdraw the bobbin from between the stripping jaws.

As the head of the bobbin passes the spring plates 113 and 114 the bobbin is permitted to fall into a suitable receptacle (not shown) while the waste yarn which is held back by the stripping plates 32 and 33 falls into a different receptacle, being guided thereto by a plate 164 (Fig. 2).

With this arrangement of combined pushing and pulling members, the waste yarn is very effectively removed from the bobbins.

Having thus described my invention it will be evident that changes and modifications can be made therein by those skilled in the art within the spirit and scope of my invention as set forth in the claims and I do not wish to be otherwise limited to the details herein disclosed but what I claim is:—

1. A bobbin stripping machine having, in combination, bobbin stripping devices, means to partially remove said bobbin longitudinally from between said devices, additional means to positively complete such movement, and means to yieldingly support the bobbin during the latter operation and to permit discharge of a misplaced bobbin.

2. A bobbin stripping machine having, in combination, bobbin stripping devices, means to partially remove a bobbin from between said devices, a forked pulling member yieldable in one direction, means to move said member toward said bobbin and to yieldingly displace said member by engagement with the bobbin head and means to withdraw said forked member in positive engagement with the head of the bobbin, thereby completing the removal of the bobbin from the stripping device.

3. A bobbin stripping machine having, in combination, bobbin stripping devices, means to move a bobbin longitudinally between said devices, and means positioned for engagement and movement by a misplaced bobbin when thus moved longitudinally and effective to stop the machine when thus moved.

4. In a bobbin stripping machine, bobbin stripping devices, a hopper, a feed plate, means to periodically slide said feed plate to advance a bobbin from said hopper to said stripping devices, and means to stop the machine when free sliding movement of said plate is prevented.

5. In a bobbin stripping machine, bobbin stripping devices, a hopper, a feed plate, said plate comprising two parts normally movable together to feed a bobbin, and means to stop the machine, said means being made effective by relative movement between the two parts of said plate.

6. In a bobbin stripping machine, bobbin stripping devices, a hopper, a holding finger normally in operative position, and means to periodically withdraw said finger to permit a bobbin to advance to delivery position in said hopper and to simultaneously feed a previously advanced bobbin from the hopper to stripping position.

7. In a bobbin stripping machine, bobbin stripping devices, a hopper, a bobbin holding finger normally in operative position, a bobbin feeding device, and connections between said feeding device and said finger effective to withdraw said finger to permit a bobbin to advance to delivery position in said hopper and simultaneously with the operation of said feeding device to positively move a previously advanced bobbin to stripping position.

8. In a bobbin stripping machine, bobbin stripping devices, a feed plate having a cam roll thereon, a slide having a cam slot for said roll, and means to move said slide periodically to actuate said feed plate.

9. In a bobbin stripping machine, bobbin stripping devices, a feed plate having a cam roll thereon, a slide having a cam slot for said roll, and means to move said slide periodically to actuate said feed plate, said cam roll being mounted for yielding movement relative to said bobbin engaging portion of said feed plate if movement of the latter is obstructed.

10. In a bobbin stripping machine, a pair of rotatable stripping plates, means to oppose light spring tension against initial separation of said plates, and means to oppose heavy spring tension to further separation thereof.

11. In a bobbin stripping machine, a pair of rotatable stripping plates, means to oppose light spring tension against initial separation of said plates, and means to oppose heavy spring tension to further separation thereof, said first means including an arm comprising two parts spaced a definite limited distance apart by a relatively light spring, said parts positively engaging each other after such limited relative movement thereof.

12. In a bobbin stripping machine, a frame, a pair of rotatable stripping discs, shafts for said discs, and a swivel bearing for one of said shafts, said bearing being vertically adjustable in said frame.

13. In a bobbin stripping machine, in combination, bobbin stripping devices, a hopper, a pair of yieldingly mounted fingers each normally in operative position, a feeding device, mechanical means to positively withdraw one only of said fingers as said feeding device is operated, the other finger being yieldingly displaced by the lowermost bobbin in said hopper as said bobbin is discharged from the hopper, and means to positively force said lowermost bobbin from the hopper to stripping position.

In testimony whereof I have hereunto affixed my signature.

GEORGE J. PFEIFFER.